United States Patent
Sekine (10) Patent No.: US 11,108,983 B2
(45) Date of Patent: Aug. 31, 2021

(54) IMAGING DEVICE (71) Applicant: Tianma Japan, Ltd., Kanagawa (JP)

(72) Inventor: Hiroyuki Sekine, Kanagawa (JP)

(73) Assignee: TIANMA JAPAN, LTD., Kanagawa (JP)

(*) Notice: Subject to any disclaimer, the term of this patent is extended or adjusted under 35 U.S.C. 154(b) by 0 days.

(21) Appl. No.: 16/904,228

(22) Filed: Jun. 17, 2020

(65) Prior Publication Data
US 2020/0404210 A1 Dec. 24, 2020

(30) Foreign Application Priority Data
Jun. 18, 2019 (JP) .............................. JP2019-112620

(51) Int. Cl.
H04N 5/378 (2011.01)
H04N 5/3745 (2011.01)

(52) U.S. Cl.
CPC ......... *H04N 5/378* (2013.01); *H04N 5/37457* (2013.01)

(58) Field of Classification Search
CPC .. H04N 5/378; H04N 5/37457; H04N 5/3597; H04N 5/3745; H04N 5/369; H05G 1/64; G01T 1/24; H01L 27/146
See application file for complete search history.

(56) References Cited

U.S. PATENT DOCUMENTS

| | | | | |
|---|---|---|---|---|
| 5,376,782 A * | 12/1994 | Ikeda | ...................... | H04N 1/028 250/208.1 |
| 7,688,947 B2 * | 3/2010 | Mollov | .................. | G01T 1/2018 378/98.8 |
| 8,139,055 B2 * | 3/2012 | Brown | ................... | H04N 5/335 345/207 |
| 2004/0119855 A1 * | 6/2004 | Partain | ................... | H04N 5/361 348/243 |
| 2019/0123080 A1 * | 4/2019 | Kanicki | ............ | H01L 27/14663 |

* cited by examiner

Primary Examiner — Nhan T Tran
(74) Attorney, Agent, or Firm — Sughrue Mion, PLLC (57) ABSTRACT An imaging device supplies a first constant potential and a second constant potential to a photodiode through a first line and a second line to put the photodiode in a reverse-bias state. The imaging device reads a signal corresponding to the potential at the other end of the photodiode changed by light incident on the photodiode in the reverse-bias state. The imaging device supplies a potential that changes with time to a capacitive element through a control line so that a forward current flows through the photodiode disposed between the capacitive element and the first line after reading the signal.

7 Claims, 6 Drawing Sheets

EQUIVALENT CIRCUIT OF PIXEL

EQUIVALENT CIRCUIT OF PIXEL

FIG. 8

IMAGING DEVICE

CROSS-REFERENCE TO RELATED APPLICATIONS

This non-provisional application claims priority under 35 U.S.C. § 119(a) on Patent Application No. 2019-112,620 filed in Japan on Jun. 18, 2019, the entire content of which is hereby incorporated by reference.

BACKGROUND

This disclosure relates to an imaging device.

Image sensors using a photodiode (PD) as a photoelectric conversion element are known. This type of image sensor includes a plurality of pixel circuits. Each of these pixel circuits includes a photodiode and a switching transistor for selecting the pixel circuit to read the signal of the photodiode.

The image sensor detects an optical signal by a driving method as follows. The image sensor puts the switching transistor in an ON state and applies a reverse-bias voltage across the photodiode for the period from a time T1 until a time T2. The image sensor puts the switching transistor in an OFF state for the period from the time T2 until a time T3. If the photodiode receives light in this period, the electric charge stored in the photodiode decreases so that the cathode potential of the photodiode falls.

The image sensor puts the switching transistor in the ON state again for the period from the time T3 to a time T4. Then, an electric current in the amount that compensates for the electric charge decreased in accordance with the amount of the incident light flows in a signal line. The image sensor integrates this current to detect the amount of the incident light.

It is known that image lag occurs in existing image sensors including photodiodes, particularly image sensors including amorphous silicon (a-Si) photodiodes. U.S. Pat. No. 7,688,947 B discloses a method to eliminate this image lag. Providing two thin film transistors (TFTs) in each pixel, this method turns on one of them to read the signal charge of the photodiode and thereafter, turns on the other TFT to apply a forward-bias voltage to the photodiode for some period.

SUMMARY

An aspect of this disclosure is an imaging device includes pixels and a control circuit. A circuit configuration of each pixel includes: a photodiode; a first line to supply a first constant potential to one end of the photodiode; a second line to supply a second constant potential to the other end of the photodiode; a capacitive element one end of which is connected with the other end of the photodiode; and a control line to supply a control signal to the other end of the capacitive element. The control circuit is configured to: supply the first constant potential and the second constant potential to the photodiode through the first line and the second line to put the photodiode in a reverse-bias state; read a signal corresponding to the potential at the other end of the photodiode changed by light incident on the photodiode in the reverse-bias state; supply a potential that changes with time to the capacitive element through the control line so that a forward current flows through the photodiode disposed between the capacitive element and the first line after reading the signal; and supply the first constant potential and the second constant potential to the photodiode through the first line and the second line to put the photodiode in the reverse-bias state after supplying the potential that changes with time to the capacitive element through the control line so that a forward current flows through the photodiode.

It is to be understood that both the foregoing general description and the following detailed description are exemplary and explanatory and are not restrictive of this disclosure.

EMBODIMENTS

Hereinafter, embodiments will be described with reference to the accompanying drawings. It should be noted that the embodiments are merely examples to implement this disclosure and are not to limit the technical scope of this disclosure. The drawings may exaggerate the sizes and/or shapes of the elements for clear understanding of the description.

The imaging device disclosed hereinafter includes one or more pixels each including a photodiode (PD) as a photoelectronic conversion element and one or more switching transistors. It is known that image lag occurs in existing image sensors (examples of imaging devices) employing a-Si photodiodes.

One of the causes of the image lag is a low charging rate because of the insufficient current driving ability of the switching transistor and another cause is that photoexcited carriers (electrons and holes) trapped in a specific level such as the level of a defect in the bandgap between the valence band and the conduction band of amorphous silicon are stochastically emitted and join the signal charge.

The carriers re-emitted from the trap cannot be distinguished from the carriers excited by light; the number of carriers trapped in the aforementioned specific level increases with the intensity of the incident light; accordingly, image lag gets perceived. The image lag occurs in not only imaging devices including a-Si photodiodes but also imaging devices including photodiodes in which carriers are trapped in a specific level.

The imaging device in this disclosure applies a forward-bias voltage to the photodiode via a capacitive element to make a forward current flow through the photodiode. Because of this forward current, carriers are trapped in the specific level with high probability to significantly diminish the effect of photoexcited carrier trapping. Furthermore, the forward current that flows through the photodiode can be made low by applying the forward-bias voltage through the capacitive element.

Embodiment 1

Figure 1:
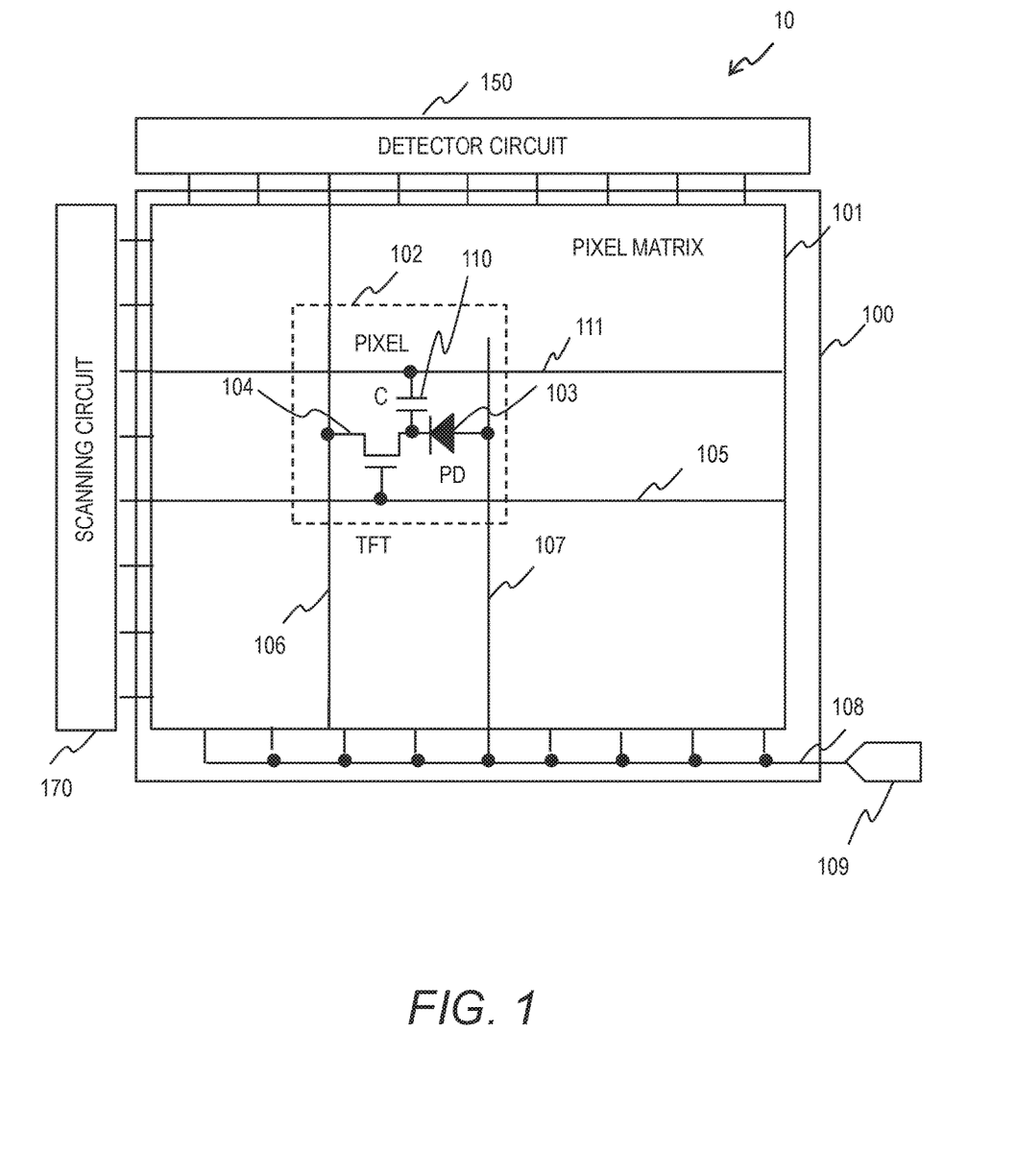
FIG. 1 is a block diagram illustrating a configuration example of an image sensor in Embodiment 1 as an example of an imaging device.

FIG. 1 is a block diagram illustrating a configuration example of an image sensor, which is an example of an imaging device. The image sensor 10 is used to take an image of transmitted x-rays, for example. The image sensor 10 includes a pixel matrix 101, a scanning circuit 170, and a detector circuit 150. The image sensor 10 further includes a not-shown scintillator disposed on its irradiation side to cover the pixel matrix 101. The scanning circuit 170 and the detector circuit 150 are included in a control circuit. The features of this disclosure are applicable to other types of imaging devices, such as visible-light image sensor and line sensor.

The pixel matrix 101 includes pixels 102 arrayed in a matrix. The pixel matrix 101 is formed on a sensor substrate 100. The sensor substrate 100 is an insulative substrate made of glass, for example. Each pixel 102 includes a photodiode 103, a thin-film transistor (TFT) 104, and a capacitive element 110.

The pixels 102 are disposed at intersections between a plurality of signal lines 106 and a plurality of scanning lines 105. In FIG. 1, the signal lines 106 are disposed to extend vertically and be distant horizontally from one another. The scanning lines 105 are disposed to extend horizontally and be distant vertically from one another. Each pixel 102 is connected with a bias line 107 and a control line 111. In FIG. 1, bias lines are disposed to extend vertically and be distant horizontally from one another and control lines 111 are disposed to extend horizontally and be distant vertically from one another. In FIG. 1, only one of the pixels, one of the signal lines, one of the scanning lines, one of the bias lines, and one of the control lines are provided with reference signs 102, 106, 105, 107, and 111, respectively.

Each signal line 106 is connected with a different pixel column. Each scanning line 105 is connected with a different pixel row. Each control line 111 is connected with a different pixel row. The signal line 106 is connected with the detector circuit 150 and the scanning line 105 is connected with the scanning circuit 170. Each bias line 107 is connected with a common bias line 108. A bias potential is applied to a pad 109 of the common bias line 108.

Figure 2:
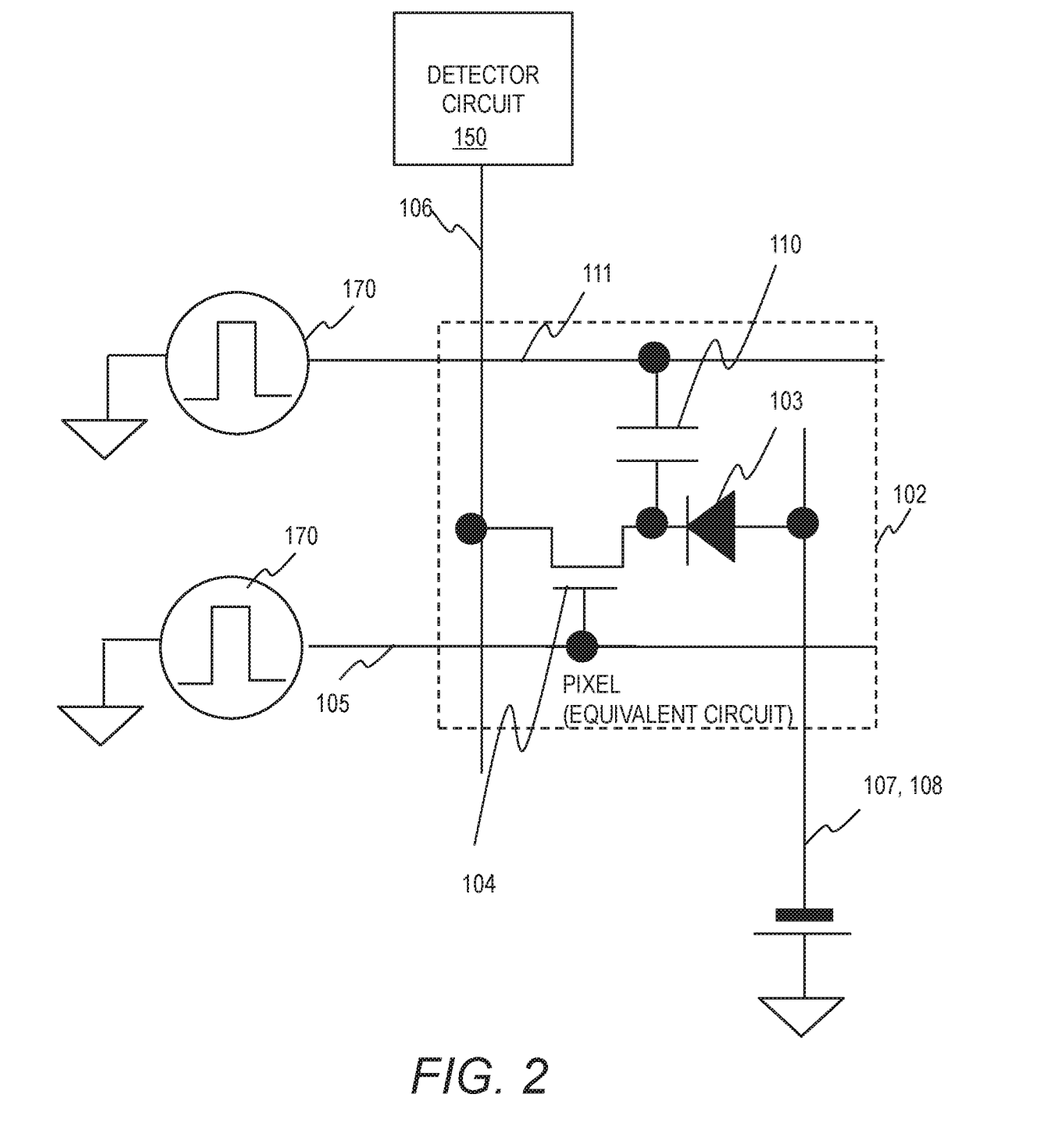
FIG. 2 is a circuit diagram illustrating a configuration example of an equivalent circuit of a pixel (a circuit configuration of a pixel) in Embodiment 1.

FIG. 2 is a circuit diagram illustrating a configuration example of an equivalent circuit of a pixel 102 (a circuit configuration of a pixel). The pixel 102 includes a photodiode 103 as a photoelectric conversion element, a thin film transistor 104 as a switching element, and a capacitive element 110 (electrostatic capacitance C) for making a forward current flow through the photodiode 103. The gate terminal of the thin film transistor 104 is connected with a scanning line 105 and one of the source/drain terminals is connected with a signal line 106 and the other source/drain terminal is connected with the cathode terminal of the photodiode 103. The anode terminal of the photodiode 103 is connected with a bias line 107.

One of the terminals of the capacitive element 110 is connected with a node located between the cathode terminal of the photodiode 103 and the source/drain terminal of the thin film transistor 104. The other terminal of the capacitive element 110 is connected with a control line 111.

The thin film transistor 104 can be an amorphous silicon (a-Si) thin film transistor or an oxide semiconductor thin film transistor. The photodiode 103 can be an a-Si photodiode. The photodiode 103 in the following description is assumed to be an a-Si photodiode.

The image sensor 10 used as an X-ray imaging device reads a signal by taking out the signal charge stored in proportion to the amount of X-ray irradiation from each photodiode 103 to the external. The signal charge can be taken out by making the thin film transistor 104 in the pixel 102 conductive.

Specifically, the anode terminal of the photodiode 103 is connected with a bias line 107 and the signal line 106 is maintained at a reference potential by the detector circuit 150. Accordingly, the photodiode 103 is charged to the difference voltage between the bias potential of the bias line 107 and the reference potential. This difference voltage is determined so that the cathode potential is higher than the anode potential to reverse-bias the photodiode 103 (a reverse-bias state). The bias potential (the first constant potential) of the bias line (the first line) 107 and the reference potential (the second constant potential) of the signal line (the second line) 106 are fixed constant direct potentials.

The reason to apply the reverse-bias voltage to the photodiode 103 is to transport pairs of holes and electrons excited by light to the source/drain regions with an electric field. Although an internal electric field is generated by the p-n junction without application of the reverse-bias voltage, the electric field is so small that the amount of detectable light is small. The reverse-bias voltage is applied to increase the amount of detectable light. When the reverse-bias voltage is increased, the dark current becomes higher; accordingly, an optimum voltage is determined to meet the usage.

When a photodiode 103 in a reverse-bias state is illuminated with light, signal charge (photoexcited carriers) is generated by photoexcitation. As a result of generation of carriers by photoexcitation, the voltage across the photodiode 103 decreases. The bias potential of the bias line 107 is constant and the cathode potential of the photodiode 103 decreases. When the photodiode 103 is regarded as a capacitor, the charge stored in the capacitor decreases.

The scanning circuit 170 selects scanning lines 105 one by one to apply a pulse to turn on the thin film transistor 104. A current in the amount to compensate for the charge of the photodiode 103 decreased in accordance with the amount of the incident light flows through the signal line 106. The charge required to recharge the photodiode 103 to the reverse-bias voltage depend on the amount of light incident on the photodiode 103. The detector circuit 150 detects the amount of the incident light by integrating this current.

The scanning circuit 170 outputs a control signal for applying a forward-bias voltage to the photodiode 103 to the control line 111 synchronously with selecting the scanning line 105. The control line 111 supplies the control signal (a potential for forward-biasing) to the cathode terminal of the photodiode 103 through the capacitive coupling of the capacitive element 110. The potential supplied through the control line 111 is lower than the bias potential, so that a forward current flows through the photodiode 103 from the anode terminal to the cathode terminal. This forward current significantly diminishes the effect of photoexcited carrier trapping.

Figure 3:
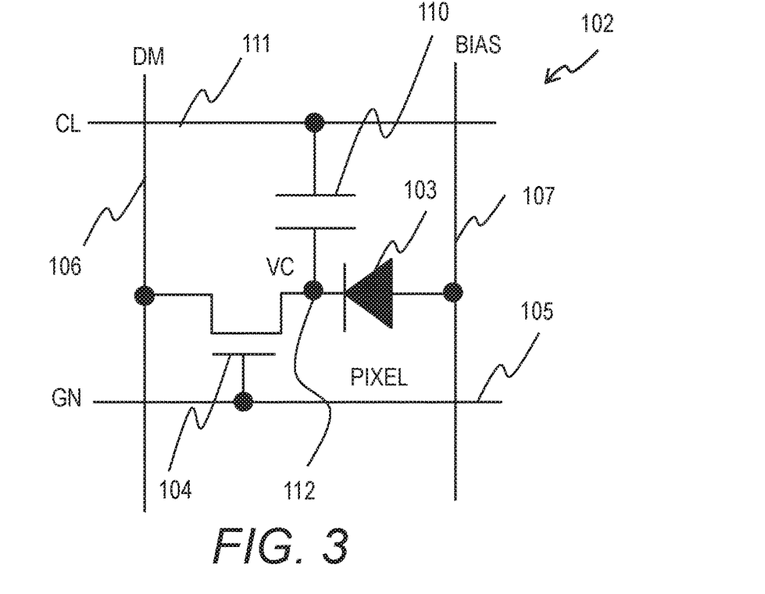
FIG. 3 illustrates signals to be supplied to the pixel in Embodiment 1.

FIG. 3 illustrates signals to be supplied to the pixel 102. It can be regarded that the signal line 106 is kept being supplied with a constant reference potential DM from the detector circuit 150. For example, the detector circuit 150 can be a charge detection circuit (integrator circuit); it integrates the charge by applying a voltage to a feedback capacitor so that the input to the detector circuit will always be a constant potential. The signal line 106 is maintained at a constant potential as a result of the integration.

The control line 111 is supplied with a control signal CL; the bias line 107 is supplied with a bias potential BIAS; and the scanning line 105 is supplied with a scanning signal GN. The cathode of the photodiode 103 and the connection node of the source/drain of the thin film transistor 104 and the capacitive element 110 have the same potential VC.

Figure 4:
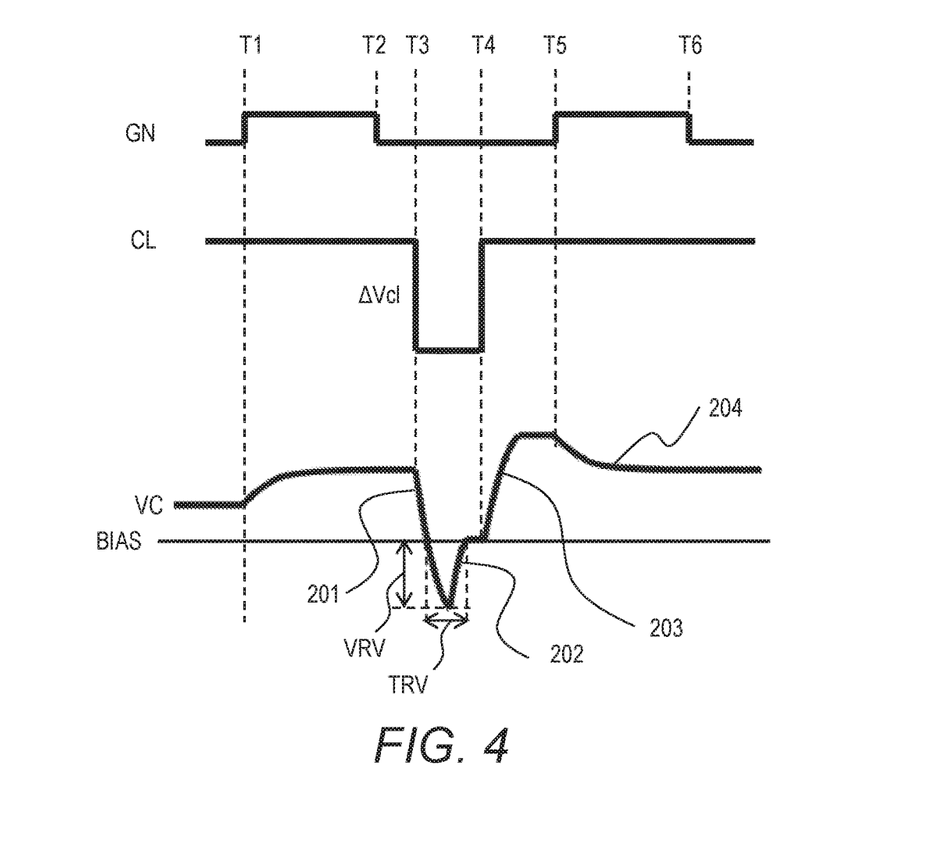
FIG. 4 is a timing chart of a scanning signal and a control signal supplied to a pixel together with a node potential (the cathode potential of a photodiode) in Embodiment 1.

FIG. 4 is a timing chart of the scanning signal GN and the control signal CL supplied to the pixel 102 together with the node potential (the cathode potential of the photodiode 103) VC. The scanning circuit 170 changes the scanning signal GN from a low level to a high level at a time T1 and keeps the thin film transistor 104 be ON for the period from the time T1 to a time T2. The detector circuit 150 reads the current flowing in the signal line 106 (the signal corresponding to the cathode potential of the photodiode 103) for the period from the time T1 to the time T2 to detect the amount of the incident light.

The scanning circuit 170 changes the scanning signal GN from the high level to the low level at the time T2 and keeps the thin film transistor 104 be OFF for the period from the time T2 until a time T5. At a time T3, the scanning circuit 170 puts a negative pulse in the control signal CL and supplies it to the capacitive element 110. The negative pulse has a voltage ΔVcl.

The control signal CL changes from a high level (the reference potential) to a low level (a predetermined potential) at the time T3 later than the time T2 and returns from the low level to the high level at a time T4. In the period where the control signal changes from the high level to the low level and returns to the high level, a forward current flows through the photodiode 103. The time T4 is a time earlier than the time T5. In this way, the scanning circuit 170 supplies a potential that changes with time to the capacitive element 110 through the control line 111. The control signal CL can have a waveform (change with time) different from a negative pulse as far as it can reduce the node potential VC by the capacitive coupling of the capacitive element 110. The time T2 and the time T3 can be the same time. The control signal CL does not need to return to the high level at the time T4.

The scanning circuit 170 changes the scanning signal GN from the low level to the high level at the time T5 and keeps the thin film transistor 104 be ON for the period from the time T5 until a time T6. During this period, a reverse-bias voltage is applied across the photodiode 103. The scanning circuit 170 changes the scanning signal GN from the high level to the low level at the time T6 to turn off the thin film transistor 104. If the photodiode 103 is illuminated with light in the period from the time T6 until the next time T1, the charge stored in the photodiode 103 decreases so that the cathode potential of the photodiode 103 falls.

The node potential (the cathode potential of the photodiode 103) VC gradually increases from the time T1 because of the recharge from the signal line 106. The node potential VC falls to a potential lower than the bias potential BIAS through the capacitive coupling of the capacitive element 110 (the section 201) because the potential of the control signal CL is lowered at the time T3.

Figure 5:
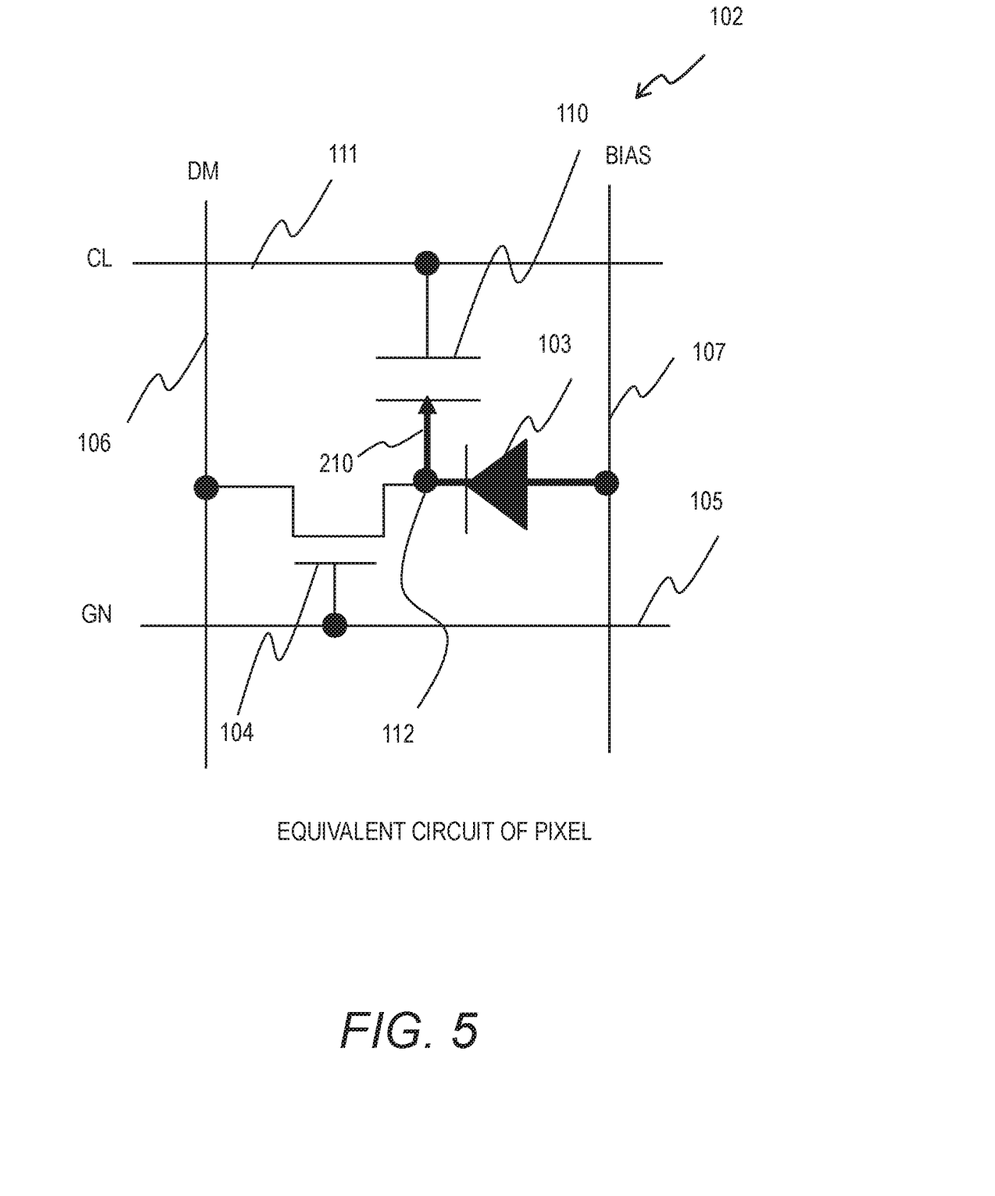
FIG. 5 illustrates a state in which a forward current flows from a bias line to a capacitive element through a photodiode because of a forward-bias voltage in Embodiment 1.

Since the node potential VC is lower than the bias potential BIAS, a forward-bias voltage VRV is applied across the photodiode 103. As illustrated in FIG. 5, a forward current 210 flows from the bias line 107 to the capacitive element 110 through the photodiode 103 because of the forward-bias voltage. As a result, carriers are trapped in the level of the photodiode 103 with high probability to diminish the effect of photoexcited carrier trapping, resulting in reduction of image lag.

The forward current 210 flowing through the photodiode 103 drastically increases the node potential VC toward the bias potential BIAS (the section 202). The period TRV where the forward-bias voltage is applied across the photodiode 103 is short; the forward-bias voltage for the photodiode 103 decreases sharply because of the forward current 210. The node potential VC becomes substantially equal to the bias potential BIAS.

As described above, the control circuit varies the potential of the capacitive element 110 to temporarily apply a forward-bias voltage to the photodiode 103. Since the forward-bias voltage decreases sharply, a high current does not flow through the photodiode 103. The current that flows through the photodiode 103 is at most the amount of charge ($C*\Delta Vcl$) stored in the capacitive element 110.

When the potential of the control signal CL increases at the time T4, the node potential VC also increases (the section 203) through the capacitive coupling of the capacitive element 110. Further, when the thin film transistor 104 is turned ON at the time T5, the node potential VC approaches the reference potential from the signal line 106 (the section 204). A predetermined reverse-bias voltage is written to the photodiode 103.

Embodiment 2

Figure 6:
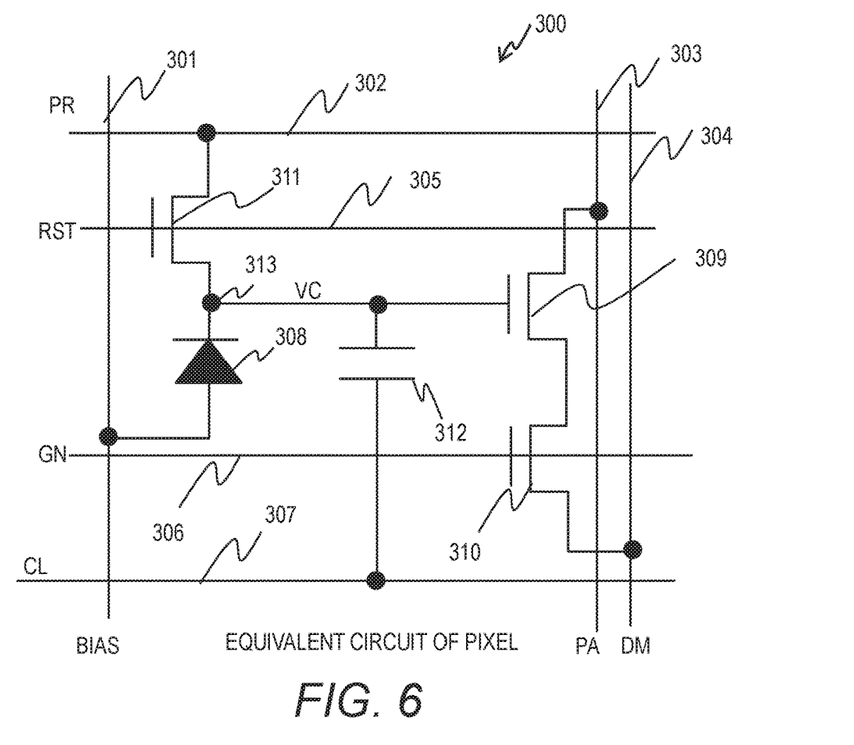
FIG. 6 illustrates a configuration example of a pixel (an equivalent circuit thereof) in Embodiment 2.

FIG. 6 illustrates a configuration example of a pixel (an equivalent circuit thereof) 300 in Embodiment 2. The pixel 300 in this embodiment amplifies the signal from the photodiode to read. Reading the signal corresponding to the cathode potential of the photodiode through an amplifier attains high S/N ratio. The pixel 300 includes a photodiode 308, a thin film transistor 310 as the first switching element, a thin film transistor 311 as the second switching element, an amplifier thin film transistor 309, and a capacitive element 312 for making a forward current flow through the photodiode 308.

The thin film transistor 310 controls reading the signal from the photodiode 308. The thin film transistor 311 controls applying a reverse-bias voltage to the photodiode 308. The thin film transistor 309 amplifies the signal from the photodiode 308 to read. The thin film transistors 309, 310, and 311 can be a-Si thin film transistors or oxide semiconductor thin film transistors. The photodiode 308 can be an a-Si photodiode.

The gate terminal of the thin film transistor 310 is connected with a scanning line 306; one of the source/drain terminals is connected with a signal line 304; and the other source/terminal is connected with the source/drain terminal of the thin film transistor 309. The signal line 304 is connected with a constant potential through a resistor having high resistance or a constant current source in the detector circuit 150.

The gate terminal of the thin film transistor 309 is connected with the cathode terminal of the photodiode 308; one of the source/drain terminals is connected with a power line 303; and the other source/drain terminal is connected with the source/drain terminal of the thin film transistor 310.

The anode terminal of the photodiode 308 is connected with a bias line 301. The cathode terminal of the photodiode 308 is connected with a power line 302 for the reverse-bias voltage via the thin film transistor 311. The gate terminal of the thin film transistor 311 is connected with a control line 305; one of the source/drain terminals is connected with the power line 302 for the reverse-bias voltage; and the other source/drain terminal is connected with the cathode terminal of the photodiode 308.

In this configuration, the potentials of the cathode terminal of the photodiode 308, the gate terminal of the thin film transistor 309, and a connection node 313 between the capacitive element 312 and the source/drain terminal of the thin film transistor 311 are denoted by VC.

One of the terminals of the capacitive element 312 is connected with a node between the cathode terminal of the photodiode 308 and the gate terminal of the thin film transistor 309. The cathode terminal of the photodiode 308 is connected with the gate terminal of the thin film transistor 309, the source/drain terminal of the thin film transistor 311, and one of the terminals of the capacitive element 312. The other terminal of the capacitive element 312 is connected with a control line 307.

The scanning line 306 is supplied with a scanning signal GN. The control line 307 is supplied with a control signal CL for controlling the cathode potential of the photodiode 308 via the capacitive element 312. The control line 305 is supplied with a control signal RST for controlling the voltage to be applied to the photodiode 308.

The power line 303 is supplied with a potential PA for amplifying the output of the photodiode 308. The bias line 301 is supplied with a bias potential BIAS and the power line 302 is supplied with a preset potential PR for supplying the photodiode 308 with a reverse-bias voltage. The potentials PA and PR are fixed constant direct potentials. The preset potential (second constant potential) PR supplied to the power line (second line) 302 is higher than the bias potential (first constant potential) BIAS; a reverse-bias voltage of the difference between the preset potential PR and the bias potential BIAS is applied to the photodiode 308.

For example, the scanning circuit 170 controls the signal GN for the scanning line 306, the signal RST for the control line 305, and the signal CL for the control line 307. The detector circuit 150 reads the amplified signal of the photodiode 308 through the signal line 304. The detector circuit 150 or the scanning circuit 170 supplies the power line 303 with the potential PA, the bias line 301 with the bias potential BIAS, and the power line 302 with the preset potential PR.

The scanning circuit 170 selects scanning lines 306 one by one to apply a signal to turn on the thin film transistor 310. A current flows through the signal line 304 in the amount to meet the cathode potential of the photodiode 308 decreased in accordance with the amount of incident light. The cathode potential of the photodiode 308 depends on the amount of the light incident on the photodiode 308 in a reverse-bias state. A voltage in accordance with the cathode potential of the photodiode 308 is output to the signal line 304 via the amplifier thin film transistor 309 and the detector circuit 150 reads the voltage.

The scanning circuit 170 outputs a control signal RST for applying a reverse-bias voltage to the photodiode 308 to the control line 305 synchronously with selecting the scanning line 306. When the thin film transistor 311 is turned ON, the power line 302 supplies the preset potential PR to the cathode terminal of the photodiode 308. A reverse-bias voltage between the preset potential PR and the bias potential BIAS is applied to the photodiode 308.

The scanning circuit 170 outputs a control signal CL for applying a forward-bias voltage to the photodiode 308 to the control line 307. The control line 307 supplies the control signal CL (a potential for forward-biasing) to the cathode terminal of the photodiode 308 via the capacitive coupling of the capacitive element 312. The potential supplied by the control line 307 is lower than the bias potential BIAS, so that a forward current flows from the anode terminal to the cathode terminal of the photodiode 308. This forward current significantly diminishes the effect of photoexcited carrier trapping.

Figure 7:
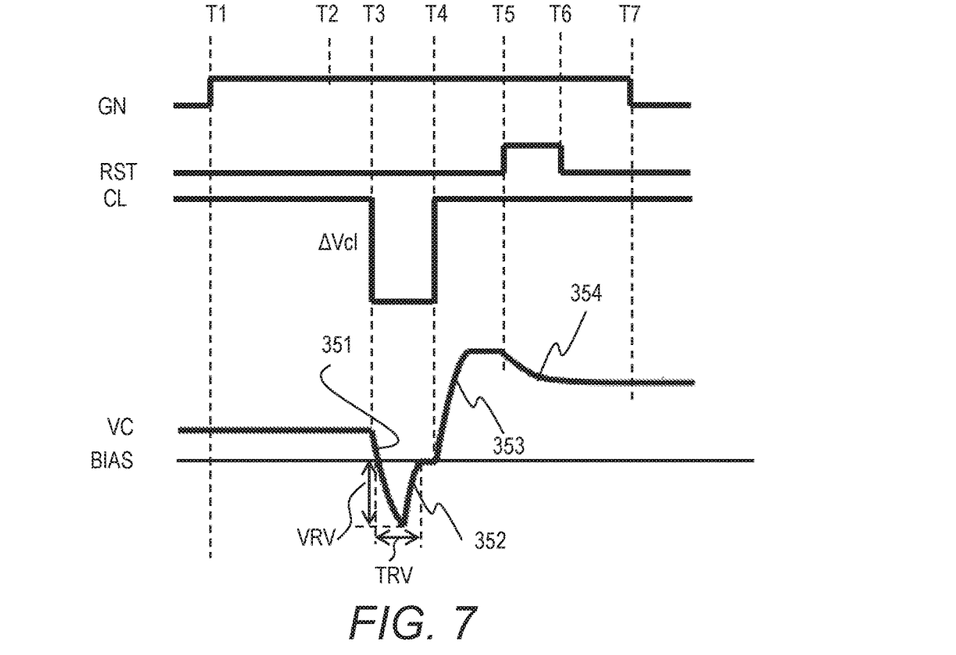
FIG. 7 is a timing chart of a scanning signal and a control signal supplied to a pixel together with a node potential (the cathode potential of a photodiode) in Embodiment 2.

FIG. 7 is a timing chart of the scanning signal GN, the control signal RST, and the control signal CL supplied to the pixel 102 together with the node potential (the cathode potential of the photodiode 308) VC. The scanning circuit 170 changes the scanning signal GN from a low level to a high level at a time T1 and keeps the thin film transistor 310 be ON for the period from the time T1 to a time T7. The detector circuit 150 reads the potential of the signal line 304 at the time T2 to detect the amount of the incident light.

The scanning circuit 170 supplies a potential that changes with time to the capacitive element 312 through the control line 307. Specifically, the scanning circuit 170 puts a negative pulse in the control signal CL and supplies it to the capacitive element 312 at a time T3 later than the time T2. The negative pulse has a voltage ΔVcl. The control signal CL changes from a high level to a low level at the time T3 later than the time T2 and returns from the low level to the high level at a time T4.

During this period, a forward current flows through the photodiode 308. The control signal CL can have a waveform (change with time) different from a negative pulse as far as it can reduce the node potential VC by the capacitive coupling of the capacitive element 110.

The scanning circuit 170 changes the control signal RST from a low level to a high level at a time T5 later than the time T4 and keeps the thin film transistor 311 be ON for the period from the time T5 to a time T6. The preset potential PR is supplied to the cathode terminal of the photodiode 308 from the power line 302 for the period from the time T5 to the time T6. During this period, a reverse-bias voltage is applied across the photodiode 308.

The scanning circuit 170 changes the control signal RST from the high level to the low level at the time T6 and subsequently, changes the scanning signal GN from the high level to the low level at a time T7 to turn OFF the thin film transistor 310. If the photodiode 308 is illuminated with light in the period from the time T7 until the next time T1, the charge stored in the photodiode 308 decreases so that the cathode potential of the photodiode 308 falls.

The node potential (the cathode potential of the photodiode 308) VC shows a potential corresponding to the amount of incident light from the time T1 until the time T3. The node potential VC falls to a potential lower than the bias potential BIAS through the capacitive coupling of the capacitive element 312 (the section 351) because the potential of the control signal CL is lowered at the time T3. Since the node potential VC is lower than the bias potential BIAS, a forward-bias voltage VRV is applied across the photodiode 308.

Because of the forward-bias voltage, a forward current flows from the bias line 307 to the capacitive element 312 through the photodiode 308. As a result, carriers are trapped in the level of the photodiode 308 with high probability to diminish the effect of photoexcited carrier trapping, resulting in reduction of image lag.

The forward current flowing through the photodiode 308 drastically increases the node potential VC toward the bias potential BIAS (the section 352). The period TRV where the forward-bias voltage is applied across the photodiode 308 is short; the forward-bias voltage at the photodiode 308 decreases sharply because of the forward current. The node potential VC becomes substantially equal to the bias potential BIAS.

The control circuit varies the potential of the capacitive element 312 to temporarily apply a forward-bias voltage to the photodiode 308. Since the forward-bias voltage decreases sharply, a high current does not flow through the photodiode 308. The current that flows through the photodiode 308 is at most the amount of charge (C*ΔVcl) stored in the capacitive element 312.

When the potential of the control signal CL increases at the time T4, the node potential VC also increases (the section 353) through the capacitive coupling of the capacitive element 312. Further, when the thin film transistor 311 is turned ON at the time T5, the node potential VC approaches the preset potential PR from the power line 302 (the section 354). A predetermined reverse-bias voltage is written to the photodiode 308.

The detector circuit 150 reads the output (reference signal) of the amplifier thin film transistor 309 in response to the preset potential PR in the period from the time T6 to the time T7 in order to correct the signal corresponding to the cathode potential of the photodiode 308 changed by illumination with light. The detector circuit 150 calculates the difference between the reference signal and the read signal to cancel the offset of the amplifier thin film transistor 309 in detecting the signal representing the illumination with light.

Figure 8:
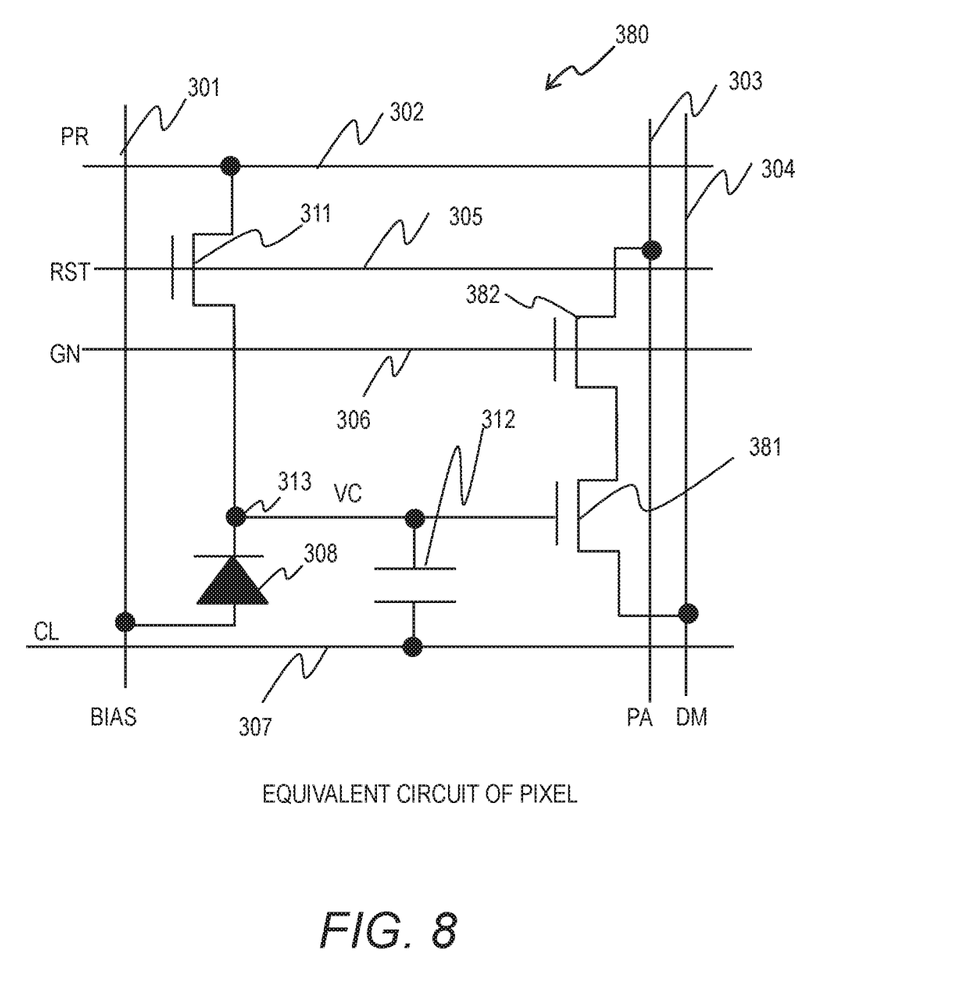
FIG. 8 illustrates another configuration example of a pixel (an equivalent circuit thereof) in Embodiment 2.

FIG. 8 illustrates another configuration example of a pixel (an equivalent circuit thereof) 380 in Embodiment 2. Differences from the circuit configuration illustrated in FIG. 6 are mainly described. The pixel 380 includes a thin film transistor 382 as a first switching element and an amplifier thin film transistor 381.

The thin film transistor 382 controls reading the signal from the photodiode 308. The thin film transistor 381 amplifies the signal read from the photodiode 308. The thin film transistors 381 and 382 can be a-Si thin film transistors or oxide semiconductor thin film transistors.

The gate terminal of the thin film transistor 382 is connected with a scanning line 306; one of the source/drain terminals is connected with a power line 303; and the other source/drain terminal is connected with the source/drain terminal of the thin film transistor 381. The gate terminal of the thin film transistor 381 is connected with the cathode terminal of the photodiode 308; one of the source/drain terminals is connected with a signal line 304; and the other source/drain terminal is connected with the source/drain terminal of the thin film transistor 382.

The potentials of the cathode terminal of the photodiode 308, the gate terminal of the thin film transistor 381, and a connection node 313 between the capacitive element 312 and the source/drain terminal of the thin film transistor 311 are denoted by VC.

One of the terminals of the capacitive element 312 is connected with a node between the gate terminal of the thin film transistor 381 and the connection node 313 between the cathode terminal of the photodiode 308 and source/drain terminal of the thin film transistor 311. The cathode terminal of the photodiode 308 is connected with the gate terminal of the thin film transistor 381, the source/drain terminal of the thin film transistor 311, and one of the terminals of the capacitive element 312.

As described above, the first switching transistor for selecting the pixel to read the signal and the amplifier thin film transistor are replaced with each other between the configuration example of the pixel 380 in FIG. 8 and the configuration example of the pixel 300 in FIG. 6. The change of the control signal and the variation of the node potential VC are the same as those described with reference to FIG. 7.

Although the conductivity types of the thin film transistors in the pixel circuits described with reference to the drawings in Embodiment 1 and Embodiment 2 are n-type, they can be p-type. The orientations of the photodiodes can be opposite to those illustrated in the drawings in Embodiment 1 and Embodiment 2. In order to forward bias the photodiode, a positive pulse can be applied to the anode terminal. It is preferable that the anode terminal of the photodiode faces the surface to be illuminated because the hole mobility in a-Si photodiodes is small.

As set forth above, embodiments of this disclosure have been described; however, this disclosure is not limited to the foregoing embodiments. Those skilled in the art can easily modify, add, or convert each element in the foregoing embodiments within the scope of this disclosure. A part of the configuration of one embodiment can be replaced with a configuration of another embodiment or a configuration of an embodiment can be incorporated into a configuration of another embodiment.

What is claimed is:

1. An imaging device comprising:
   pixels; and
   a control circuit,
   wherein a circuit configuration of each pixel includes:
      a photodiode;
      a first line to supply a first constant potential to one end of the photodiode;
      a second line to supply a second constant potential to the other end of the photodiode;
      a capacitive element one end of which is connected with the other end of the photodiode; and
      a control line to supply a control signal to the other end of the capacitive element, and
   wherein the control circuit is configured to:
      supply the first constant potential and the second constant potential to the photodiode through the first line and the second line to put the photodiode in a reverse-bias state;
      read a signal corresponding to the potential at the other end of the photodiode changed by light incident on the photodiode in the reverse-bias state;
      supply a potential that changes with time to the capacitive element through the control line so that a forward current flows through the photodiode disposed between the capacitive element and the first line after reading the signal; and
      supply the first constant potential and the second constant potential to the photodiode through the first line and the second line to put the photodiode in the reverse-bias state after supplying the potential that changes with time to the capacitive element through the control line so that a forward current flows through the photodiode.

2. The imaging device according to claim 1, wherein the photodiode is an amorphous silicon photodiode.

3. The imaging device according to claim 1, wherein the potential that changes with time is a pulse that changes from a reference potential to a predetermined potential and returns from the predetermined potential to the reference potential.

4. The imaging device according to claim 3, wherein a width of the pulse is shorter than a period for which the control circuit reads the signal corresponding to the potential at the other end of the photodiode.

5. The imaging device according to claim 1, further comprising a switching transistor between the second line and the photodiode,
   wherein the control circuit is configured to:
      put the switching transistor in an ON state and read the signal corresponding to the potential at the other end of the photodiode through the second line;
      put the switching transistor in an OFF state after reading the signal and supply a potential that changes with time to the capacitive element through the control line so that a forward current flows through the photodiode disposed between the capacitive element and the first line; and
      put the switching transistor in an ON state after supplying the potential that changes with time to the capacitive element and supply the first constant potential and the second constant potential to the photodiode through the first line and the second line to put the photodiode in a reverse-bias state.

6. The imaging device according to claim 1, further comprising:
   an amplifier transistor to amplify the potential of the other end of the photodiode;
   a signal line to transmit a signal corresponding to the potential of the other end of the photodiode sent from the amplifier transistor;
   a first switching transistor to switch on and off output of the amplifier transistor to the signal line; and
   a second switching transistor disposed between the second line and the photodiode,
   wherein the control circuit is configured to:
      put the first switching transistor in an ON state and read the signal corresponding to the potential at the other end of the photodiode changed by light incident on the photodiode in the reverse-bias state through the signal line in a period where the first switching transistor and the second switching transistor are in an OFF state;
      supply the potential that changes with time to the capacitive element through the control line so that a forward current flows through the photodiode disposed between the capacitive element and the first line after reading the signal;
      put the second switching transistor in an ON state after supplying the potential that changes with time to the capacitive element and supply the first constant potential and the second constant potential to the photodiode through the first line and the second line to put the photodiode in a reverse-bias state; and
      put the first switching transistor and the second switching transistor in an OFF state after putting the photodiode in a reverse-bias state.

7. The imaging device according to claim 1, wherein the one end of the photodiode is an anode and the other end of the photodiode is a cathode.

* * * * *